UNITED STATES PATENT OFFICE.

MAXIMILIAN RIEGEL, OF BERLIN, GERMANY.

PROCESS OF PURIFYING WATER FROM GERMS BY MEANS OF BROMIN.

1,094,475.  Specification of Letters Patent.  Patented Apr. 28, 1914.

No Drawing.  Application filed January 16, 1914. Serial No. 812,574.

*To all whom it may concern:*

Be it known that I, MAXIMILIAN RIEGEL, a citizen of the German Empire, and residing at Berlin, Germany, have invented a certain new and useful Improved Process of Purifying Water from Germs by Means of Bromin, of which the following is a specification.

The subject-matter of this invention is a process of purifying water from germs by means of bromin.

The problem of rendering water free from germs without apparatus in a short time has not as yet been solved. A method which is good in itself has been disclosed by Schumburg. It substantially consists in mixing the water with a predetermined quantity of bromin and dissolved potassium bromid (0.06 bromin in 1 liter of water) and then after 15 minutes' reaction with the calculated quantity of sodium sulfite and anhydrous sodium carbonate, liberating it from free bromin. The process has not been largely used in the art, because an exact test of the process by Surgeon-Major Dr. Schüder published in the "*Zeitschrift für Hygiene und Infektionskrankheiten*" Leipzig 1901, vol. 37, page 307, showed the utter uselessness of the method. The explanation of the striking fact that the method sometimes produced a negative result and at other times a positive result was stated by Schüder on page 315 of the same article to be due to the water mixed with cholera cultures containing small particles of cultures which are covered with a coating of bromo-albumin, and the more so the more concentrated is the added bromin solution. The individuals located within are then protected by the layer of bromo-albumin from the action of the bromin. Now I have found that in an acid solution insoluble bromo-albumin is not formed at all and that in drinking water acidified, for example, with hydrochloric acid absolutely all the germs are killed by the admixture of a bromin solution in potassium bromid. As the insoluble layer of bromo-albumin is not formed the bromin is able to penetrate into the central parts of the conglomerates of bacteria and to kill all the individuals. As acid, hydrochloric acid is preferably used. For various reasons all other acids have proved to be unsuitable. In Schumburg's process the bromin does not act as free bromin, but it combines at once with the lime of the water to form potassium bromid and hypobromite of lime. According to the present process the lime is converted into chlorid of calcium, on which the bromin solution does not act; thus a free bromin reaction takes place. This is recognized at once by the water mixed with a small quantity of bromin dissolved in potassium bromid being scarcely colored yellowish, but at once assuming an intense yellow color when some hydrochloric acid is added beforehand or subsequently. The quantity of bromin to be added and the duration of the action of the same depends on the percentage of organic substance in the water. The quantity of hydrochloric acid to be added depends on the percentage of alkalis in the water, so much hydrochloric acid being employed that, after complete neutralization of the lime and of the magnesia, the water still contains about 0.05% hydrochloric acid. After the termination of the reaction the water is mixed with that quantity of sodium carbonate which is calculated to be sufficient for neutralizing the hydrochloric acid and with the calculated quantity of sodium sulfite for binding the free bromin. Instead of sodium carbonate, however, any other suitable alkali may be used. The acid is preferably added before the admixture of the solution of bromin in potassium-bromid or simultaneously therewith.

Example: 100 liters of Berlin town supply water are intimately mixed with 200 grams of pure 25% hydrochloric acid. 600 grams of a solution consisting of 6 g. bromin, 4.5 g. potassium bromid and 588 g. water are then added. After 15 minutes a mixture of 9.5 g. sodium sulfite and 80.5 g. dry sodium carbonate, or instead of the latter 120 g. sodium bicarbonate is added.

I claim:—

1. A process of purifying water from germs consisting in mixing hydrochloric acid with the water and in adding a solution of bromin in potassium bromid, and in then removing the free acid and the free bromin therefrom by adding a predetermined quantity of a mixture of sodium sulfite and an alkali.

2. A process of purifying water from germs consisting in mixing hydrochloric acid with the water and in simultaneously adding a solution of bromin in potassium bromid, and in then removing the free acid and the free bromin therefrom by adding a predetermined quantity of a mixture of sodium sulfite and sodium carbonate.

In testimony whereof, I affix my signature in the presence of two witnesses.

MAXIMILIAN RIEGEL.

Witnesses:
WOLDEMAR HAUPT,
HENRY HASPER.

Copies of this patent may be obtained for five cents each, by addressing the "Commissioner of Patents, Washington, D. C."